3,574,809
METHOD FOR MAKING ORIENTED WEBS POSSESSING PROJECTING UNORIENTED SECTIONS
Theodore H. Fairbanks, West Chester, Robert F. Gillespie, Havertown, and Dorsey C. Nelson, Springfield, Pa., assignors to FMC Corporation, Philadelphia, Pa.
Filed Dec. 17, 1968, Ser. No. 784,382
Int. Cl. D01d 5/20
U.S. Cl. 264—167         7 Claims

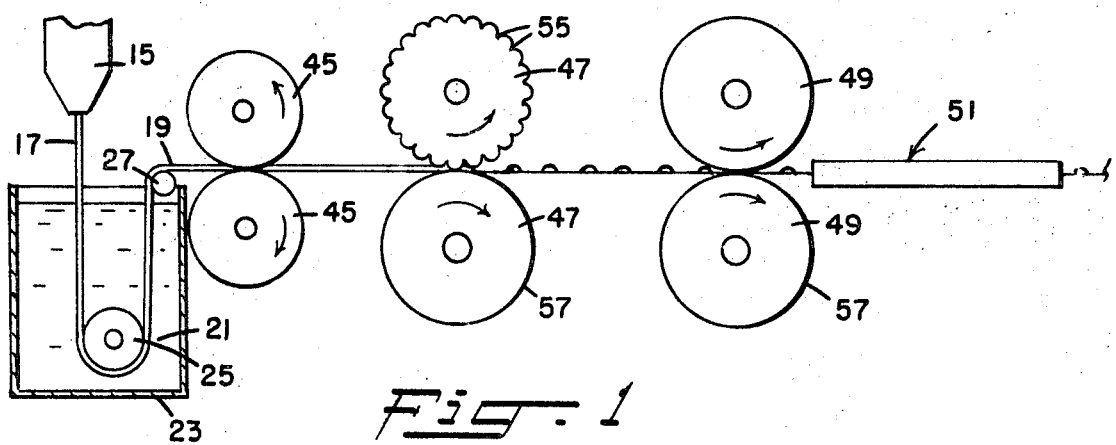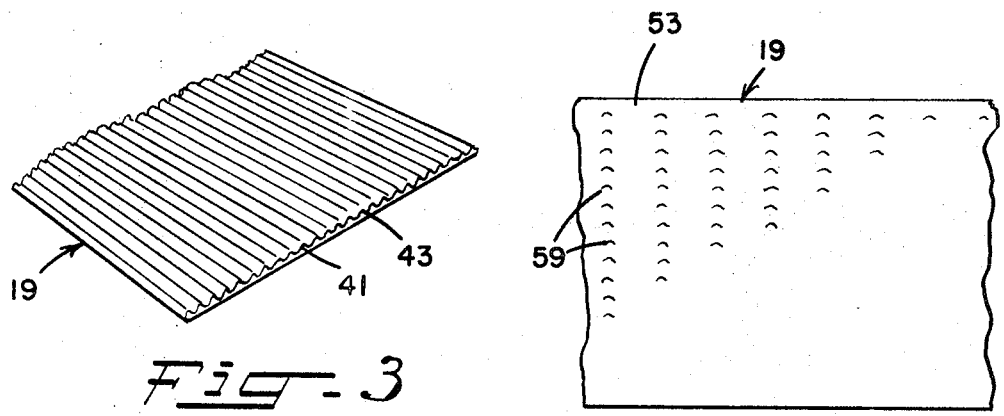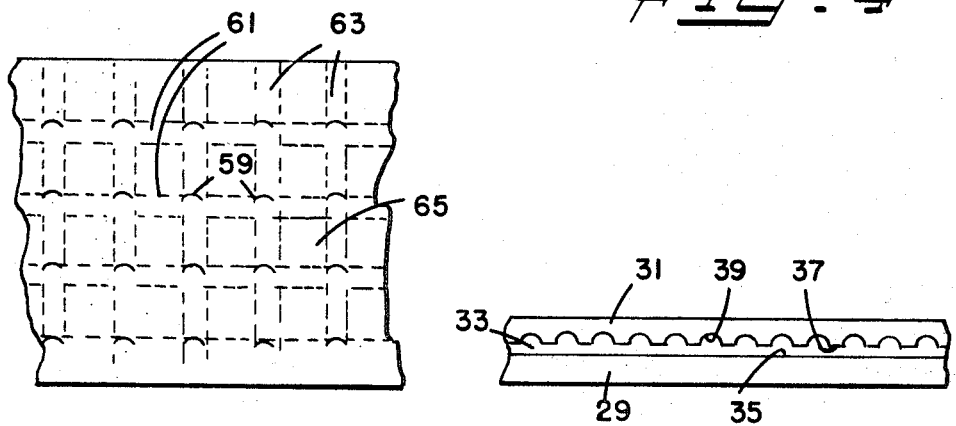

ABSTRACT OF THE DISCLOSURE

Manufacture of an unbroken polymeric web or film having projecting unoriented sections surrounded by a predetermined pattern of uniaxially and biaxially oriented regions is disclosed wherein the patterned web is produced by a longitudinal stretching of the said web at longitudinally spaced intervals followed by a transverse stretch of the resulting structure.

---

The present invention is directed to an improved method for making polymeric webs or films which possess high strength, stiffness and tear resistant properties.

U.S. Pat. 3,386,876, issued on June 4, 1968, to H. W. Wyckoff, discloses a method and apparatus for making a nonwoven net structure by providing an unoriented film of thermoplastic polymeric material with a predetermined pattern of openings so as to shape the film areas between such openings into the form of ribs, each having a narrow part and being of greatest width at its ends, and thereafter stretching such perforated film at least along one of its biaxial directions to enlarge the openings and uniaxially draw at least certain of such ribs. While some latitude is permitted in the shaping and spacing of the openings initially formed in the film and the forces applied during stretching, these factors are regulated to restrict orientation to only selected areas of the film, and more specifically to insure that the oriented ribs terminate at or are connected by undrawn film portions or junctures.

During the stretching of the perforated film, the ribs are progressively oriented in the direction of the applied stretching force or forces that is, with uniaxial drawing in each successive group of parallel ribs occurring simultaneously and extending to a predetermined degree along such ribs before drawing starts in adjacent groups of ribs which are in the series therewith. In accordance with the teachings of this Wyckoff patent, to insure proper stretching two basic requirements must be met, as follows:

(1) Ribs which are to draw in parallel with each other must be capable of being drawn to substantially the same amount, and (2) Ribs which are to be drawn in series with each other must be of comparable cross-section so that stretching will be initiated in a group of undrawn ribs after drawing is completed in adjacent group of ribs and before such drawn ribs are stretched beyond their breaking point or a predetermined point compatible with other drawing which is to be or has been accomplished.

More particularly, the above-noted Wyckoff patent teaches that the openings formed in the unoriented film are spaced so that the ratio between the widest and narrowest parts of the ribs is at least equal to the ratio between the load required to initiate drawing of such ribs and the load necessary for maintaining such drawing once the ribs have yielded. When such ribs have been stretched to the maximum allowable degree the line defining the end of a drawn rib, which is referred to in the Wyckoff patent as a "draw-line," will have approximately the maximum length possible without having the juncture between the ends of adjacent ribs stretch and without having the draw-line of one rib interfere or cross with the draw-lines of the other ribs at such juncture.

In applications where a perforated finished product is unsatisfactory, the above-noted patent teaches that selected spaced areas of an unoriented thermoplastic film may be painted, dyed or otherwise coated with a black or other heat absorbing pigment. These coated areas would correspond to openings formed in the film and, upon biaxially stretching such film under hot drawing conditions, as with radiant heating, the coated areas would absorb the greatest amount of heat and, therefore would yield, without being oriented, when the film is subjected to stretching forces. On the other hand, only the uncoated rib areas would react to the stretching forces exerted along their respective longitudinal axes and would be uniaxially drawn, while the junctures between the drawn ribs would remain undrawn.

As a still further alternative the Wyckoff patent teaches that in lieu of or in combination with the coating procedure described above, a heat reflective material, such as aluminium paint, may be applied to the unoriented film of polymeric material in accordance with a predetermined pattern corresponding to the desired arrangement of ribs and undrawn junctures. Upon biaxially orienting of such film under hot drawing conditions, the rib areas coated with the heat reflective material would be heated the least and would undergo uniaxial orientation, while the coated areas would yield along the biaxial directions.

During the stretching of a film coated with a heat absorbing and/or heat reflecting material in accordance with the Wyckoff patent teachings, the coated areas of the film would yield and thus the coatings thereon would gradually become thinner and progressively less efficient in performing their intended functions with the continued stretching of the film.

U.S. Pat. 3,255,065, issued on June 7, 1966, to H. W. Wyckoff, discloses a method and apparatus for making a composite film by laminating or otherwise uniting an unbroken and unoriented film of thermoplastic polymeric material with a similar film having a predetermined pattern of openings, as disclosed in the Wyckoff Pat. 3,386,876, and thereafter stretching of the laminated structure along desired directions.

Upon stretching of such laminated structure along its longitudinal and transverse axes, the portions of the unbroken film which extend across the openings in the perforated film are biaxially oriented. The ribs of the perforated film, and the portions of the unbroken film attached thereto, are uniaxially oriented and impart desired stiffness into the resulting composite film, while the areas of the laminated structure which are located between the ends of such ribs remain undrawn.

The manufacture of composite films by the method described in the Wyckoff Pat. 3,255,065 requires the production of separate unoriented films of thermoplastic polymeric material, the perforating of one of such films, the laminating of the unperforated and perforated films, and finally the biaxial stretching of the laminated struuture. These numerous manipulative steps, taken with the critical care which must be exercised to insure proper film perforation and lamination render this patented method slow and costly.

A primary object of this invention is to provide a new or generally improved and more satisfactory method for making a polymeric web or film having good strength and stiffness along desired directions and which exhibits improved tear resistant characteristics.

Another object is the provision of an improved method for providing a web or film of polymeric material having projecting unoriented sections surrounded by a predetermined pattern of uniaxially and biaxially oriented regions.

Still another object of this invention is a method which facilitates a controlled orientation of an unperforated web or film along selected areas thereof.

A further object is the provision of a method for making an unbroken polymeric web having a network of uniaxially oriented regions extending longitudinally and transversely of the web and which are separated at their ends by projecting unoriented sections.

For a greater understanding of this invention, reference is made to the following detailed description and drawing in which FIG. 1 is a diagrammatic side view of the apparatus employed in the method of the present invention;

FIG. 2 is a fragmentary front view of a portion of an extrusion die employed in the apparatus shown in FIG. 1;

FIG. 3 is a perspective view of a portion of a web of polymeric material formed in accordance with the method of the present invention;

FIG. 4 is a perspective view of the web shown in FIG. 3 after longitudinal stretching of the same in accordance with the method of the present invention; and FIG. 5 is a plan view of the web shown in FIG. 3 after biaxial orientation thereof.

The above and other objects of the invention are achieved by a method in which a polymeric film-forming material is initially shaped into an unoriented web having continuous, alternate thick and thin portions extending longitudinally thereof, with each of the respective thick and thin portions of the web being of substantialy uniform cross-section throughout its length. Areas extending transversely of such web, at longitudinally spaced intervals thereof, are then stretched in a longitudinal direction whereby sections of the thick and thin portions of the web within the stretched areas are reduced in thickness and the molecules thereof are oriented in the longitudinal direction of the web. The web is then stretched in its transverse direction to reduce the thickness of all of the web portions defined by the original continuous thin portions of the web and to orient the molecules thereof in the transverse direction of the web. In the resulting stretched web the remaining sections of the original thick portions are unoriented. Regions of the stretched web extending between such remaining original thick sections of the web in both the longitudinal and transverse direction are uniaxially oriented in their respective directions, while all other regions of the web are biaxially oriented.

In the shaping of the unoriented web, the continuous thick portions thereof may project from one or both sides of the web. In the latter instance, it is necessary that the thick portions projecting from one side of the web be aligned with the thick portions projecting from the opposite side of such web. The widths of the respective thick and thin portions of the web are equal and in the preferred construction the widths of all of the thick and thin portions are substantially the same.

The widths and spacing of the transverse areas of the unoriented web which are stretched in a longitudinal direction may be varied. Preferably, however, the widths of such areas and their longituidnal spacing is substantially equal to the widths of an individual thick portion of the original web.

The degree to which the web is stretched in its longitudinal and transverse direction may also differ. In the preferred embodiment, the web is stretched equally in both its longitudinal and transverse directions. The degree of stretching is such as to provide the resulting oriented web with the most desirable strength, stiffness and tear resistant properties. Desirably, the degree of biaxial stretching is such that the lines defining the ends of the uniaxially drawn regions terminate at undrawn web portions without intersecting with each other. The thick portions of the web are such that, under the stretching conditions noted above, the stretched sections of such thick web portions are reduced to a thickness substantially equal to the thickness of the original thin web portions.

Oriented webs made in accordance with the present invention are adapted for a variety of uses, for example, as protective coverings or shields, or in building construction, as wrapping and bagging materials, as inflatable structures, such as observation balloons, life rafts, etc.

While the method of the present invention is particularly well adapted for use with thermoplastic polymeric materials, such as polypropylene, polyethylene, polyesters, etc., it is also well suited for use with orientable polymeric film-forming materials which are converted into integral webs by chemical reactions, such latter material including, for example, viscose.

The apparatus employed in the method of the present invention includes means for shaping flowable polymeric film-forming material into a continuous stream having continuous, alternate thick and thin portions extending longitudinally thereof with each of the respective thick and thin portions of such stream being of substantially uniform cross-section throughout its length, means for setting the shaped stream of film-forming material to provide an unoriented, self-supporting web, means for stretching the web in its longitudinal direction at longitudinally spaced intervals thereof, and means for stretching the longitudinally stretched web in its transverse direction. Intermittent longitudinal stretching of the web as mentioned above may be achieved by advancing the web between spaced pairs of nip rolls, with the leading pair of such nip rolls being periodically rotated at a more rapid rate than the trailing pair of such nip rolls. Alternatively, the leading pair of nip rolls may be rotated at a constant speed while at least one of the trailing pairs of nip rolls is formed with continuous grooves extending longitudinally thereof at spaced intervals along its peripheral surface so that the web is periodically gripped during its advancement.

For a more detailed description of the method of the present invention, and the apparatus employed therein, reference is made to FIG. 1 of the drawing wherein character 15 designates a nozzle or die which is part of a conventional extrusion system from which is extruded a shaped unbroken stream 17 of molten thermoplastic polymeric film-forming material, such as polypropylene. The extruded stream 17 is set in any convenient manner to provide a self-supporting web 19. Quenching of the extruded stream of molten thermoplastic material may be effected by a bath of cool water 21 contained within a tank 23. An immersion roll 25 is located well within the tank 23 for reversing the travel of the web 19 and directing the same to a guide roll 27.

Illustrated in FIG. 2 are die lips or blades 29 and 31 of the nozzle 15 which together define an elongated orifice 33 of desired configuration. The surface 35 of the die lip 29 is substantially flat while the opposing surface 37 of the die lip 31 includes a series of spaced grooves 39 which extend substantially perpendicular to the length of such lip. The stream 17 of molten thermoplastic material assumes the shape imparted thereto by the opposing surfaces of the die lips 29 and 31 and, when quenched, provides a resulting web 19 with continuous, alternate thick and thin portions 41 and 43, respectively, which extend the length thereof, as shown in FIG. 3. Each of the respective thick and thin portions 41 and 43 of the web 19 is of substantially uniform cross-section throughout its length and, in the particular web illustrated, the thick and thin web portions are substantially of uniform width. The difference in thickness between the thick and thinner portions of the web may be varied as more fully discussed hereafter.

In lieu of the web construction described, a web having thick portions or ribs 41 projecting from the opposite sides thereof is equally satisfactory for use in the method of the present invention, providing that such thick portions or ribs 41 along one side of the web are aligned or alternated with the thick portions along the opposite sides thereof. Such modified web may be formed simply by initially shaping a molten thermoplastic material between die lips having opposing surfaces which correspond to the surface 37 of the die lip 31.

Referring again to FIG. 1 of the drawing, a formed web 19 is continuously advanced out of the quenching bath and over the guide roll 27 by a pair of pull rollers 45 which are driven by suitable means, not shown, in the directions as indicated by arrows. Beyond the pull rollers 45 the web 19 travels between pairs of nip rolls 47 and 49, which are positively driven in the directions as indicated by arrows, and then into a conventional tenter frame designated generally by the character 51. During travel between the pairs of nip rolls 47 and 49, areas extending transversely of the web 19 at longitudinally spaced intervals thereof are stretched in the longitudinal direction as indicated at 53 in FIG. 4.

This desired stretching may be achieved by periodically turning the nip rolls 49 at a more rapid rate than the nip rolls 47. Alternatively, the web 19 may be intermittently gripped by the pair of nip rolls 47, while the pair of nip rolls 49 are driven at a constant but faster rate of speed than the pair of nip rolls 47. This latter procedure is preferably achieved by an apparatus as illustrated in FIG. 1 in which at least one of the nip rolls 47 is formed with like, continuous longitudinal grooves 55 which are spaced at uniform intervals along the roll perihpery, while the remaining nip rolls are of conventional construction, with each having a smooth, continuous annular peripheral surface 57.

Sections of both the thick and thin portions 41 and 43 of the web 19 within the stretched areas 53 are, of course, reduced in thickness and the molecules thereof are oriented in the longitudinal direction of the web. As heretofore mentioned, the degree to which the areas 53 are longitudinally stretched may be varied, but is preferably such as to reduce the original thickness of the thick portions 41 of the web in such areas 53 to generally the original thickness of the thin web portions 43. The longitudinally stretched web leaving the nip rolls 49 and passing into the tenter frame 51 has an appearance as shown in FIG. 4, in which each of the original continuous thick portions 41 have been reduced to a series of longitudinally spaced sections or projections 59.

In the tenter frame 51, the longitudinal edges of the web 19 are gripped at closely spaced intervals and directed along diverging paths concomitantly with longitudinal advancement of the web to thereby stretch the web in its transverse direction. This transverse stretching of the web is preferably to substantially the same degree as the longitudinal stretching to which such web had been previously subjected. Transverse stretching is confined substantially to the original continuous thin portions 43 of the web 19; that is, the continuous portions of the web which extend between adjacent rows of the longitudinally aligned portions of the thick sections or projections 59 shown in FIG. 4.

In the resulting web leaving the tenter frame 51, as illustrated in FIG. 5, the remaining sections of the original web thick portions 41 remain unoriented. Regions 61 and 63 which extend, respectively, longitudinally and transversely between adjacent of such unoriented thick portions or projections 59 are uniaxially oriented in their respective directions, while all other regions of the web, as indicated at 65, are biaxially oriented.

The uniaxially oriented regions 61 and 63 impart stiffness into the web 19 in their respective directions of orientation and, together with the biaxially oriented regions 65, improve the web tensile strength properties. The unoriented areas 59 are well isolated from each other between the surrounding oriented regions 61 and 63 and serve to arrest tearing which may have initiated the other areas of the web.

We claim:
1. A method of making a polymeric web having a predetermined pattern of molecularly oriented portions including the steps of shaping polymeric film-forming material into a unoriented web having continuous, alternate like thick and like thin portions which are of substantially the same widths and extend longitudinally thereof, each of the respective thick and thin portions of the web being of substantially uniform cross-section throughout its length, stretching in a longitudinal direction areas of the web which extend transversely across thereof at longitudinally spaced intervals whereby sections of the thick and thin portions of the web within the stretched areas are reduced in thickness and the molecules thereof are oriented in the longitudinal direction of the web, and stretching the web in its transverse direction to thereby reduce the thickness of the web portions defined by the original continuous thin portions of the web and orient the molecules thereof in the transverse direction of the web whereby in the resulting stretched web the remaining sections of the original thick portions which were not stretched in the longitudinal direction thereof are unoriented, regions of such web extending between such remaining original thick sections of the web in both the longitudinal and transverse directions are uniaxially oriented, and all other regions of the web are biaxially oriented.

2. A method as defined in claim 1 wherein the continuous thick portions project from only one side of the web.

3. A method as defined in claim 1 wherein the contiuous thick portions project from opposite sides of the web, with the thick portions projecting from one side of the web being aligned with the thick portions projecting from the opposite side of such web.

4. A method as defined in claim 1 wherein the transversely extending areas of the web which are stretched in the longitudinal direction of the web are each of a width substantially equal to the width of an individual original thin portion of the web.

5. A method as defined in claim 4 wherein the transversely extending areas of the web which are stretched in the longitudinal direction of the web are spaced apart longitudinally of the web a distance substantially equal to the width of an individual thick portion of the web.

6. A method as defined in claim 5 wherein the web is stretched to substantially the same degree in both its longitudinal and transverse directions.

7. A method as defined in claim 6 wherein the web is stretched in its longitudinal direction to such degree as to reduce the thickness of the thick portions of webs which are within the transversely extending stretched areas to substantially the original thickness of the original thin portions of the web.

References Cited
UNITED STATES PATENTS

| | | | |
|---|---|---|---|
| 2,750,631 | 6/1956 | Johnson | 264—177 |
| 3,104,937 | 9/1963 | Wyckoff et al. | 264—178 |
| 3,386,876 | 6/1968 | Wyckoff | 264—289 |

ROBERT F. WHITE, Primary Examiner

J. R. THURLOW, Assistant Examiner

U.S. Cl. X.R.

264—177, 209, 210, 289